Nov. 9, 1948.　　　　　E. B. HOBSON　　　　　2,453,371
POWER ACTUATED ROTARY SCRAPING TOOL FOR MEAT BLOCKS
Filed Aug. 30, 1946　　　　　　　　　　　　　　2 Sheets-Sheet 1
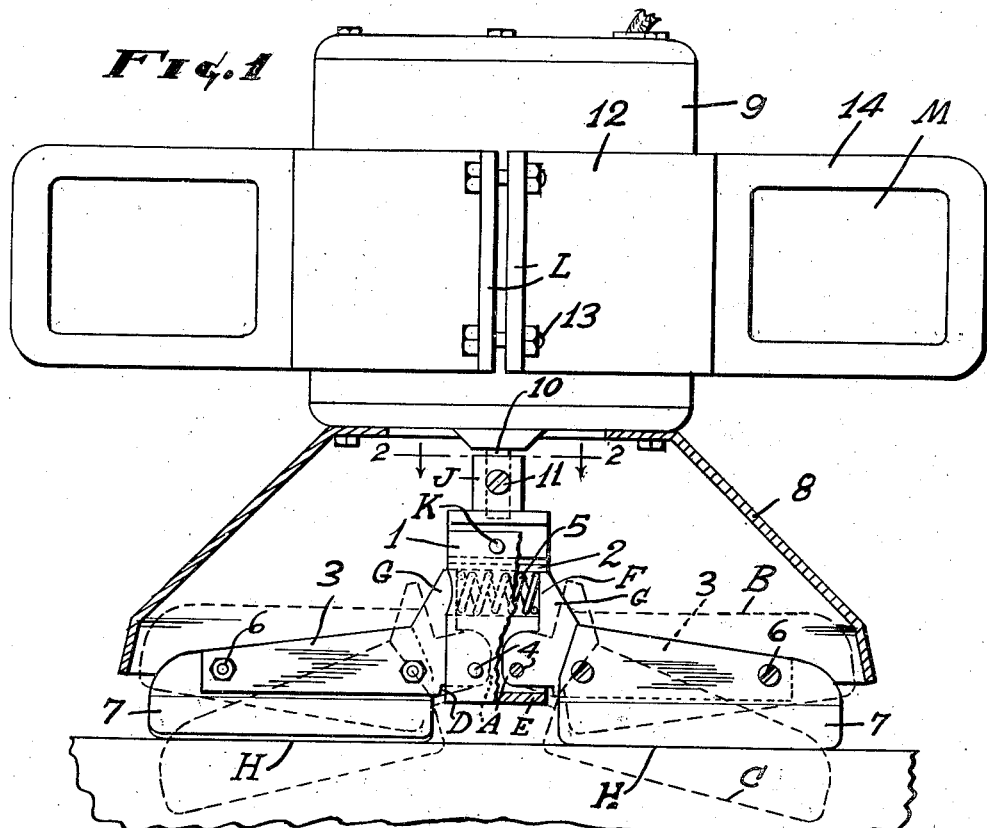
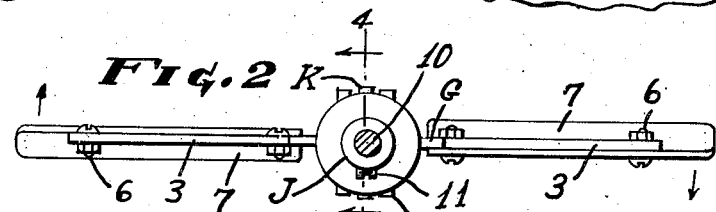
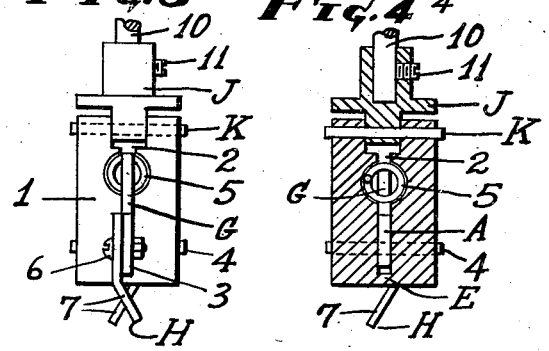
INVENTOR.
E. B. HOBSON Nov. 9, 1948.  E. B. HOBSON  2,453,371
POWER ACTUATED ROTARY SCRAPING TOOL FOR MEAT BLOCKS
Filed Aug. 30, 1946  2 Sheets-Sheet 2
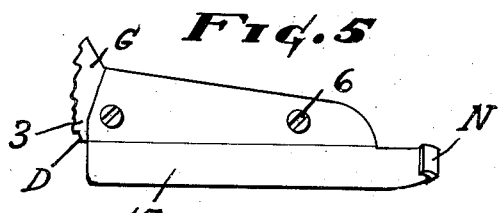
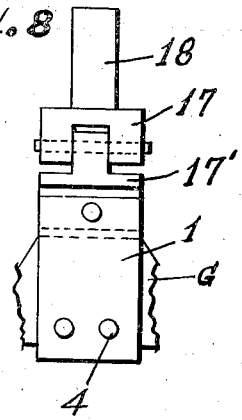
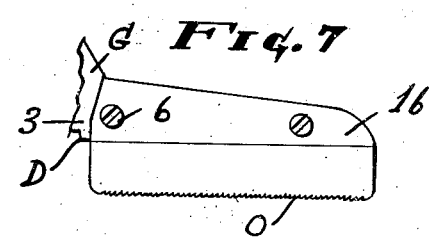
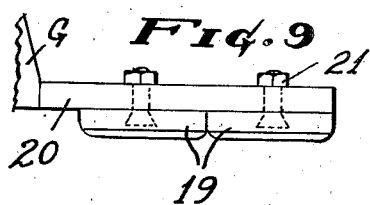
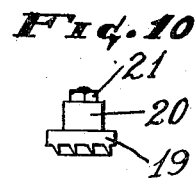
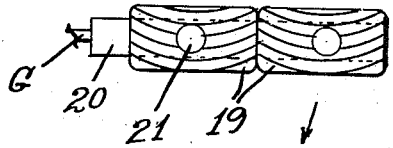
INVENTOR.
E. B. HOBSON
BY U. G. Charles
Atty.

Patented Nov. 9, 1948

2,453,371

UNITED STATES PATENT OFFICE 2,453,371

POWER ACTUATED ROTARY SCRAPING TOOL FOR MEAT BLOCKS

Elmer B. Hobson, Wichita, Kans.

Application August 30, 1946, Serial No. 693,864

2 Claims. (Cl. 144—2)

This invention relates to a rotary scraping tool, arranged preferably for re-surfacing meat blocks as well as cleansing the block from accumulation of meat particles, and has for one of its objects a plurality of radially extending blades carried by a vertically disposed body on which a motor is axially mounted to turn the body and portably guide the same during its action of service.

Another object of this invention is to rockably mount the blade carrying arms independently to re-surface irregularities that may exist on a plane that is worn from alignment.

A still further object of this invention is to construct a tool haing a cylindrical body with a pair of arms outwardly extending transverse to the cylindrical axis and on which the body turns, the axis being vertically disposed while the tool is in action, and an electric motor removably mounted at the turning axis of the rotary scraping tool by a hub that is axially bored and adapted to rock to and fro across the turning axis, the movement of which is in the direction of the arm extension; furthermore the said hub may be mounted through the medium of a universal joint arrangement as illustrated in Fig. 8.

These and other objects will hereinafter be more fully explained, reference being had to the accompanying drawings forming a part of this specification, and in which like characters will apply to like parts in the different views.

Referring to the drawings:

Fig. 1 is a side elevation of the tool, the hood being in section.

Fig. 2 is a plan view taken on line 2—2 in Fig. 1.

Fig. 3 is a transverse view to that of Fig. 1, illustrating an end view of the arms and blades, the hood and motor being removed.

Fig. 4 is a sectional view taken on line 4—4 in Fig. 2.

Fig. 5 is a side view of one of the arms and its respective blades at their leading sides, said blade being modified by a forwardly upturned end.

Fig. 6 is a plan view of Fig. 5, the direction of movement of said blade being indicated by an arrow.

Fig. 7 is a leading side elevation of another modification, illustrating the edge of the scraping blades being serrated.

Fig. 8 is an elevation of the body having a universal joint connection for the motor.

Fig. 9 is a side view of an arm having scraping sections made from rasp-like structure secured to the arm at its under side.

Fig. 10 is an end view of Fig. 9.

Fig. 11 is an underside view of Fig. 9.

As a more concise description of the drawings, it will be seen that the rotary scraping tool consists of a cylindrical body 1, said body having a slot 2 diametrically passing therethrough from one end and terminating a spaced distance inward from the other end. Rockably mounted in the slot is a pair of arms 3, through the medium of pins 4 passing through the body and said arms at their confronting ends A, that are rounded to avoid interfering with each other at the time of their rocking movement, said movements upward and downward being indicated by dotted lines B and C, respectively, in Fig. 1, the lower movement C being stopped by shoulders D that strike on the bottom E of the slot, while their upward movement B is checked by the confronting edges F of upward extensions G at the time of their engagements with their respective ends of a coil spring 5 positioned in the said slot where the same is bored to receive the spring loosely for its springing movement, whereby the arms may rock upward simultaneously or independently of each other as conditions of the surface of the meat block requires or by reason of a vertical disalignment of the head during action of scraping. It will be understood that the spring expansion will normally rock both arms downward during times of idleness of the tool.

It will be seen that the arms are apertured a spaced distance inward from their ends, through which bolts 6 will engage as removably securing means for scraping blades 7, said blades being bent obliquely with respect to cross section providing vertically positioned blade carrying portions and downwardly extending bent portions, the bends slanting rearward with respect to the blades' direction of rotation and downward, and each blade having its cutting edge H along its leading side. The blades thus formed will avoid chattering while the tool is in action of re-surfacing or scraping a meat block, or other structures.

The said rotary re-surfacing tool as above described has a conical hood 8 to function as a guard for an operator of the tool. It will be seen that the hood is secured to the lower head of an electric motor 9 that has a drive shaft 10 downwardly extending to seat in the axial bore of a hub J and being secured by a set screw 11 to turn the tool when the motor is energized, said hub being rockably connected to the upper extremity of the body by a pin K. As a means to handle the motor, there is provided an annular band 12 that is sub-divided and having out-turned ears L that are clamped together by bolts 13 to secure the band to tight engagement around the shell of the motor. The said band has a pair of rectangular handles 14 oppositely disposed, each of which has an opening M to provide gripping bars surrounding the opening that may be engaged, selectively, to handle the tool.

In Figs. 5 and 6 are shown scraping blades 15 having their outer ends N turned upward and forward to avoid corner engagement of the blades while in action and also to inwardly incline the throw of cuttings.

Fig. 7 shows the blade 16 as having a straight edge that is serrated as at O for rapidly cutting, while Fig. 8 represents a universal joint arrangement constituting members 17 and 17' to connect the motor to the upper extremity of the body. In this arrangement a chuck (not shown) is secured to the drive shaft of the motor and being adapted to engage on a spindle 18 that integrally joins to its respective rockable member 17 for one direction of rocking, while member 17' is rockably connected to the body transverse to that of the first said member, whereby a universal rocking movement is continuous in all directions from the vertical axis of the body.

Figs. 9, 10 and 11, represent sections of wood rasps 19 secured to an arm 20 by bolts 21 to also rapidly re-surface blocks, and such other modifications may be made as lie within the scope of the appended claims.

Having fully described my invention what I claim as new and desire to secure by Letters Patent is:

1. In a rotary scraping tool for meat blocks, a cylindrical body element, said element being slotted diametrically from one end to a spaced distance inwardly from the other end and being bored transversely through the body and following the slot, a pair of arms oppositely extending from the body in alignment with each other with their confronting ends engaging in the slot and each being rockably mounted for separate and simultaneous movements, as required for surfacing of a meat block, scraping blades for the arms and means to removably secure the blades to their respective arms, the blades having an oblique bend with respect to cross section and being secured to slant oppositely from their respective arms but in the same direction with respect to direction of rotation, a coil spring positioned in the bore, and the said arms having extensions toward the ends of the spring as means to move the arms to engagement with the bottom where the slot terminates when the tool is idle, a rockably jointed connection for the other end of the body, a motor having its drive shaft connected to the rockable connection to turn the slotted body, handles oppositely disposed on the motor to move the tool selectively for re-surfacing the meat block, and a guard secured to the motor and extending downwardly to cover the rotatable portion of the tool, as and for the purpose specified.

2. In a rotary scraping tool for meat blocks, a vertically positioned body element, said element being slotted transversely and having a transverse circular opening therethrough above and constituting a continuation of the slot, a pair of substantially horizontal blade carrying arms oppositely extending from the body in alignment with each other with their confronting ends engaging in the slot and rockably mounted in the body for separate and simultaneous movement of the arms as required for surfacing of a meat block, scraping blades carried by the arms, said blades obliquely extending from the arms with respect to cross section, a coil spring positioned in the circular opening, said arms having upright extensions over the ends of the spring as means to urge the arms downwardly, a portable electric motor and means to secure the motor's drive shaft to the upper end of the body element to rotate the same.

ELMER B. HOBSON.

REFERENCES CITED

The following references are of record in the file of this patent:

UNITED STATES PATENTS

| Number | Name | Date |
|---|---|---|
| 700,584 | Vautour et al. | May 20, 1902 |
| 1,532,289 | Weinbrenner | Apr. 7, 1925 |
| 1,645,317 | Carroll | Oct. 11, 1927 |
| 1,652,820 | Evans | Dec. 13, 1927 |
| 2,015,220 | Harkin | Sept. 24, 1935 |
| 2,178,169 | Goertzen | Oct. 31, 1939 |

FOREIGN PATENTS

| Number | Country | Date |
|---|---|---|
| 47,349 | Sweden | July 14, 1920 |